United States Patent
Duyck et al.

(10) Patent No.: US 7,144,951 B2
(45) Date of Patent: Dec. 5, 2006

(54) MULTIFUNCTIONAL VISCOSITY INDEX IMPROVER AND DISPERSANT

(75) Inventors: Karl Duyck, Waterbury, CT (US); Theodore E. Nalesnik, Hopewell Junction, NY (US); Uyen Thanh Tran, Sandy Hook, CT (US)

(73) Assignee: Crompton Corporation, Middlebury, CT (US)

( * ) Notice: Subject to any disclaimer, the term of this patent is extended or adjusted under 35 U.S.C. 154(b) by 41 days.

(21) Appl. No.: 10/487,180

(22) PCT Filed: Sep. 14, 2001

(86) PCT No.: PCT/US01/28606

§ 371 (c)(1),
(2), (4) Date: Feb. 18, 2004

(87) PCT Pub. No.: WO03/025034

PCT Pub. Date: Mar. 27, 2003

(65) Prior Publication Data

US 2004/0186238 A1      Sep. 23, 2004

(51) Int. Cl.
*C08L 51/06* (2006.01)
*C08F 255/02* (2006.01)

(52) U.S. Cl. ............... 525/69; 525/78; 525/83; 525/207; 525/285; 525/289; 525/293; 525/296; 525/301; 525/302; 525/309; 525/256

(58) Field of Classification Search ............... 525/69, 525/78, 83, 207, 285, 289, 293, 296, 301, 525/302, 309, 256
See application file for complete search history.

(56) References Cited

U.S. PATENT DOCUMENTS

| | | | |
|---|---|---|---|
| 3,928,497 A | 12/1975 | Ohmori et al. ............. 260/878 |
| 4,089,794 A | 5/1978 | Engel et al. ................ 252/51.5 |
| 4,160,739 A | 7/1979 | Stambaugh et al. .......... 252/34 |
| 4,161,452 A | 7/1979 | Stambaugh et al. .......... 252/34 |
| 4,517,104 A | 5/1985 | Bloch et al. ................ 252/51.5 |
| 4,624,992 A * | 11/1986 | Milani et al. ................ 525/257 |
| 4,677,151 A * | 6/1987 | Pennewiss et al. ......... 524/501 |
| 4,693,838 A | 9/1987 | Varma et al. ............... 252/51.5 |

* cited by examiner

*Primary Examiner*—James J. Seidleck
*Assistant Examiner*—Olga Asinovsky
(74) *Attorney, Agent, or Firm*—Michael P. Dilworth

(57) ABSTRACT

A process is disclosed that comprises solution grafting a hydrocarbon polymer prepared from at least $C_2$ to $C_{28}$ polymerizable hydrocarbon, said polymer having a number average molecular weight in the range of from about 5,000 to about 500,000, with an ethylenically unsaturated $C_3$ to $C_{10}$ carboxylic acid material, using a free radical initiator, in the presence of an aromatic ester oil of the formula (I) wherein $R_1$, $R_2$, $R_3$, $R_4$, $R_5$, and $R_6$ are independently selected from the group consisting of hydrogen, $-COOR_7$, $-COOR_8$, $-COOR_9$, $-COOR_{10}$, $-COOR_{11}$, and $-COOR_{12}$, provided that no more than 5 of $R_1$, $R_2$, $R_3$, $R_4$, $R_5$ and $R_6$ are hydrogen, and $R_7$, $R_8$, $R_9$, $R_{10}$, $R_{11}$, and $R_{12}$ are independently selected from the group consisting of alkyl and alkylesters

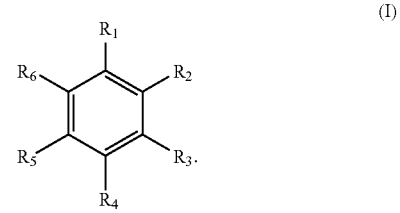

(I)

10 Claims, No Drawings

MULTIFUNCTIONAL VISCOSITY INDEX IMPROVER AND DISPERSANT

BACKGROUND OF THE INVENTION

1. Field of the Invention

The present invention relates to polymeric viscosity index improver/dispersant additives for lubricating oils. More particularly, the present invention relates to processes for preparing grafted, and optionally amine-functionalized, hydrocarbon polymers and their use in oil compositions, and includes an improved solution process for grafting unsaturated moieties onto the hydrocarbon polymer by carrying out the graft reaction in a solution medium comprising at least one aromatic ester.

2. Description of Related Art

High molecular weight hydrocarbon polymers, such as hydrogenated copolymers of isoprene and butadiene, copolymers of butadiene and styrene, and ethylene copolymers, particularly ethylene-propylene copolymers are known as viscosity index (V.I.) improving additives for oil compositions, particularly lubricating oil compositions. A substanial body of prior art exists directed towards further reacting these V.I. improvers to form multi-functional V.I. improvers. A multifunctional V.I. improver is a material that improves not only the V.I. properties of the oil, but also imparts dispersancy so as to suspend sludge that may form during the operation or use of the lubricant and to inhibit varnish deposition in engines.

U.S. Pat. No. 3,928,497 discloses a process for preparing a graft-modified ethylene polymer or copolymer which comprises reacting an ethylene polymer or copolymer with a dicarboxylic acid graft-copolymerizable therewith, or its graft-copolymerizable derivative in an alkyl-substituted aromatic hydrocarbon solvent in the presence of a radical initiator, characterized in that the reaction is performed while adding the dicarboxylic acid or its derivative gradually to the solvent in which the starting ethylene polymer or copolymer is present.

U.S. Pat. No. 4,089,794 discloses ethylene copolymers derived from about 2 to 98 wt. % ethylene, and one or more $C_3$ to $C_{28}$ alpha olefins, e.g. ethylene-propylene, that are solution-grafted under an inert atmosphere and at elevated temperatures with an ethylenically-unsaturated carboxylic acid material in the presence of a high-temperature decomposable free-radical initiator and thereafter reacted with a polyfunctional material reactive with carboxy groups; such as (a) a polyamine, or (b) a polyol, or (c) a hydroxyamine, or mixtures thereof, to form carboxyl-grafted polymeric derivatives, which have good engine sludge and varnish control behavior in fuels and lubricating oils. If the molecular weight is above 10,000, then these polymers are also useful as multifunctional viscosity index improvers.

U.S. Pat. No. 4,517,104 discloses oil soluble viscosity index improving ethylene copolymers, such as copolymers of ethylene and propylene; and ethylene, propylene and diolefin; etc., that are reacted or grafted with ethylenically unsaturated carboxylic acid moieties, preferably maleic anhydride moieties, and reacted with polyamines having two or more primary amine groups and a carboxylic acid component, preferably alkylene polyamine and alkenyl succinic anhydride, such as polyisobutenyl succinic anhydride. Or the grafted ethylene copolymer can be reacted with already formed salts, amides, imides, etc. of said polyamine and acid component, preferably imides of alkylene polyamine and alkenyl succinic anhydride. These reactions are said to permit the incorporation of varnish inhibition and dispersancy into the ethylene copolymer while inhibiting crosslinking with resulting viscosity increase, haze or gelling. The aforesaid grafting reaction may be carried out thermally, or more preferably with a free radical initiator, such as a peroxide, in a mineral lubricating oil, in which case the acid component, preferably also acts to solubilize insoluble compounds formed by side reactions, such as maleic anhydride grafted oil molecules reacted with amine, to thereby inhibit haze formation, particularly when preparing oil concentrates of the V.I.-dispersant additive for later addition to lubricating oils.

U.S. Pat. No. 4,693,838 discloses hydrocarbon polymers, such as ethylene copolymers, that may be reacted with unsaturated nitrogen-containing monomers or unsaturated carboxylic acids in a synthetic hydrocarbon lubricating oil in the presence of a free radical initiator such as a peroxide. The copolymer grafted directly with the nitrogen-containing monomers may be utilized as an additive for oil compositions, particularly lubricating oil compositions as a V.I.-dispersant additive. The polymer reacted with carboxylic acid may be further reacted with amines or amino-alcohols to also form a multifunctional V.I.-dispersant additive.

The disclosures of the foregoing are incorporated herein by reference in their entirety.

SUMMARY OF THE INVENTION

In accordance with the present invention, hydrocarbon polymers, such as ethylene-alpha olefin copolymers and terpolymers, are reacted with unsaturated carboxylic acids in at least one aromatic ester solvent and/or diluent in the presence of a free radical initiator, such as a peroxide. The polymer, after having been reacted with the carboxylic acid, may be further reacted with amines or amino-alcohols to also form a multifunctional V.I.-dispersant additive. Hydrocarbon polymers such as ethylene-alpha olefin copolymers and terpolymers may also be reacted with unsaturated nitrogen-containing monomers in an aromatic ester in the presence of a free radical initiator, such as a peroxide. The copolymer grafted directly with the nitrogen-containing monomers may be utilized as an additive for oil compositions, particularly lubricating oil compositions as a V.I.-dispersant additive.

More particularly, the present invention is directed to a process comprising solution grafting a hydrocarbon polymer prepared from at least one $C_2$ to $C_{28}$ polymerizable hydrocarbon, said polymer having a number average molecular weight in the range of from about 5,000 to about 500,000, with an ethylenically unsaturated $C_3$ to $C_{10}$ carboxylic acid material, using a free radical initiator, in the presence of an aromatic ester oil of the formula

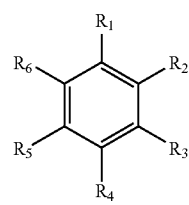

wherein $R_1$, $R_2$, $R_3$, $R_4$, $R_5$, and $R_6$ are independently selected from the group consisting of hydrogen, —COOR$_7$, —COOR$_8$, —COOR$_9$, —COOR$_{10}$, —COOR$_{11}$, and —COOR$_{12}$, provided that no more than 5 of R$_1$, R$_2$, R$_3$, R$_4$, R$_5$, and R$_6$ are hydrogen, and R$_7$, R$_8$, R$_9$, R$_{10}$, R$_{11}$, and R$_{12}$ are independently selected from the group consisting of alkyl and alkylesters.

In another aspect, the present invention is directed to a dispersant-viscosity index improver prepared by a process comprising solution grafting a hydrocarbon polymer prepared from at least one C$_2$ to C$_{28}$ polymerizable hydrocarbon, said polymer having a number average molecular weight in the range of from about 5,000 to about 500,000, with an ethylenically unsaturated C$_3$ to C$_{10}$ carboxylic acid material, using a free radical initiator, in the presence of an aromatic ester oil of the formula

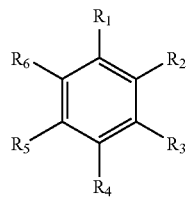

wherein R$_1$, R$_2$, R$_3$, R$_4$, R$_5$, and R$_6$ are independently selected from the group consisting of hydrogen, —COOR$_7$, —COOR$_8$, —COOR$_9$, —COOR$_{10}$, —COOR$_{11}$, and —COOR$_{12}$, provided that no more than 5 of R$_1$, R$_2$, R$_3$, R$_4$, R$_5$, and R$_6$ are hydrogen, and R$_7$, R$_8$, R$_9$, R$_{10}$, R$_{11}$, and R$_{12}$ are independently selected from the group consisting of alkyl and alkylesters.

DESCRIPTION OF THE PREFERRED EMBODIMENTS

The present invention provides a dispersant-viscosity index improver by grafting an unsaturated acid onto a high molecular weight hydrocarbon polymer in an aromatic ester in the presence of a free radical initiator and then, optionally, further reacting the product with an amine or polyol. The high molecular weight hydrocarbon polymer is of high viscosity even at grafting temperatures, so that dilution is required for processing. Mineral (or synthetic) lubricating oil can be added to form a finished additive concentrate after grafting with the unsaturated acid or, if the product is to be further reacted, such as to form a functionalized derivative, the mineral (or synthetic) oil can be used as another diluent to carry out the additional reaction and to form a useful additive concentrate.

The aromatic ester is preferably one having a low viscosity index and good oxidative stability. It is preferably a phthalate, mellitic, or terephthalate ester. The aliphatic portion of the ester preferably is derived from a linear or branched alcohol and contains from 1 to 22 carbon atoms. More preferably, the aliphatic portion of the ester preferably is derived from a linear C$_4$ to C$_{13}$ alcohol. By grafting in an aromatic ester, it appears that little, if any, of the ester undergoes grafting. Therefore, most, if not all, of the grafting that is occurring will take place on the hydrocarbon polymer. This provides a significant improvement over the use of mineral oil as solvent, since the mineral oil may undergo grafting. Grafted mineral oil molecules are generally of too low a molecular weight to be effective as dispersants, and, in fact, will generally have a negative effect on dispersancy.

The use of mineral oil as solvent for the grafting will also produce oil insoluble by-products causing excess sediment and requiring more extensive filtration. By using an ester compatible with mineral lubricating oil and thereby minimizing low molecular weight insoluble components, sediment and haze can be substantially reduced and the unsaturated carboxylic acid and, if present, the nitrogen-containing species are more efficiently utilized.

Polymers used in the practice of the present invention typically have a number average molecular weight of from about 5000 to about 500,000, preferably 10,000 to 200,000, more preferably from about 20,000 to 100,000 and will generally have a narrow range of molecular weight.

Examples of suitable hydrocarbon polymers include homopolymers and copolymers of two or more monomers of C$_2$ to C$_{28}$, preferably C$_2$ to C$_8$ olefins, including both alpha olefins and internal olefins, which may be straight or branched, aliphatic, aromatic, alkylaromatic, cycloaliphatic, and the like. Preferably, they will be copolymers of ethylene with C$_3$ to C$_{28}$ olefins, more preferably copolymers of ethylene and propylene. Other hydrocarbons that can be used include styrene, butene, isobutylene, C$_6$ and higher alpha olefins, atactic isoprene, butadiene, and the like.

The preferred polymers are prepared from ethylene and ethylenically unsaturated hydrocarbons including cyclic, alicyclic and acyclic materials containing from 3 to 28 carbon atoms, preferably 3 to 18 carbons. These ethylene copolymers may contain from 15 to 90 wt. % ethylene, preferably 30 to 80 wt. % of ethylene and 10 to 85 wt. %, preferably 20 to 70 wt. % of one or more C$_3$ to C$_{28}$, preferably C$_3$ to C$_{18}$, more preferably C$_3$ to C$_8$, alpha olefins. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha olefins, such as 4-methyl-1-pentene, 4-methyl-1-hexene, 5-methylpentene-1, 4,4-dimethyl-1-pentene, and 6-methylheptene-1, etc., and mixtures thereof.

The polymers, which term is intended to include copolymers, terpolymers, tetrapolymers, and the like, used in the practice of the present invention can include one or more non-conjugated diolefins. The amount of non-conjugated diolefin will generally range from about 0.5 to 20 mole percent, preferably about 1 to about 7 mole percent, based on the total amount of hydrocarbon, e.g., ethylene and alpha-olefin present.

Representative examples of non-conjugated dienes that can be used include 1,4-hexadiene; 1,5-heptadiene; 1,6-octadiene; 5-methyl-1,4-hexadiene; 3,7-dimethyl 1,6-octadiene; 3,7-dimethyl 1,7-octadiene; mixed isomers of dihydro-myrcene and dihydro-cymene; 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene; 1-isopropenyl-4-(4-butenyl) cyclohexane; 4,4'-dicyclopentenyl diene; 4,4'-dicyclohexenyl diene; tetrahydroindene; methyl tetrahydroindene; dicyclopentadiene; bicyclo (2.2.1) hepta-2,5-diene; ethyl norbornene; 5-methylene-6-methyl-2-norbornene; 5-methylene-6, 6-dimethyl-2-norbornene; 5-propenyl-2-norbornene; 5-(3-cyclopentenyl)-2-norbornene; 5-cyclohexylidene-2-norbornene; norbornadiene; and the like.

The compounds that can be grafted onto the hydrocarbon polymer preferably contain from 3 to 10 carbon atoms, ethylenic unsaturation, and at least one, preferably two, carboxylic acid groups, or an anhydride group, or a polar group convertible into such carboxyl groups as by oxidation or hydrolysis. Maleic anhydride or a derivative thereof is preferred as it does not homopolymerize appreciably, but attaches to the polymer to provide two carboxylic acid functionalities. Alternative examples include chloromaleic anhydride, itaconic anhydride, hemic anhydride, maleic acid, fumaric acid, monoesters of the foregoing, and the like.

As taught by U.S. Pat. Nos. 4,160,739 and 4,161,452, various other unsaturated comonomers can be grafted on the hydrocarbon polymer together with the unsaturated acid component. One or a mixture of such comonomers that are different from the unsaturated acid component and contain a copolymerizable double bond and are copolymerizable with the unsaturated acid component can be used. Such comonomers normally do not contain free carboxylic acid groups, but can be esters containing $\alpha,\beta$-ethylenic unsaturation in the acid or alcohol portion; hydrocarbons, both aliphatic and aromatic, containing $\alpha,\beta$-ethylenic unsaturation, such as the $C_4$–$C_{12}$ alpha olefins, for example, isobutylene, hexene, nonene, dodecene, and the like; styrenes, for example, styrene, $\alpha$-methyl styrene, p-methyl styrene, p-sec-butyl styrene, and the like; and vinyl monomers, for example, vinyl acetate, vinyl chloride, methyl vinyl ketone, ethyl vinyl ketone, and the like.

Nitrogen-containing unsaturated compounds are well known for forming polymers useful as oil additives. These monomers can be grafted onto the hydrocarbon polymer and include, among others, those having from 6 to 30 carbon atoms and from 1 to 4 nitrogen atoms.

Examples of such nitrogen-containing monomers include dimethylaminoethyl methacrylate; dimethylaminoethyl acrylate; N-(1,1-dimethyl-3-oxobutyl)acrylamide; N-(1,2-dimethyl-1-ethyl-3-oxobutyl) acrylamide; N-(1,3-diphenyl-1-methyl-3-oxoproyl) acrylamide; N-(1-methyl-1phenyl-3-oxobutyl)methacrylamide; N,N-diethylaminoethyl acrylamide; 2-hydroxyethyl acrylamide; acrylamide; N-dimethylaminopropyl methacrylamide; N-vinylcaprolactams; N-vinylpyrrolidone, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone; 2-vinylpyridine, 4-vinylpyridine; 2-methyl-5-vinylpyridine; 2-methyl-4-vinylpyridine; 2-vinyl-5-ethyl pyridine; 2-vinyl-6-methylpyridine; and the like.

The grafting is carried out using one or more free radical initiators, such as azoisobutyronitrile; 2,5-dimethyl-hex-3-yne-2,5 bis(t-butyl peroxide) or its hexane analogue, di-t-butyl peroxide, dicumyl peroxide, and the like. The initiator is preferably a peroxide and is generally used at a level of between about 0.005% and about 1%, based on the total weight of the polymer solution, and temperatures of about 25° to 250° C., preferably about 100° to 250° C.

The ethylenically unsaturated carboxylic acid material, which is preferably maleic anhydride, will generally be used in an amount ranging from about 0.05% to about 10%, preferably 0.1 to 4.0%, based on weight of the initial solution. The carboxylic acid material and free radical initiator are generally used in a weight percent ratio range of about 3:1 to about 30:1, preferably about 1:1 to about 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 10 hours, more preferably 0.5 to 3 hours.

The grafted polymer can be reacted with a suitable amine in a conventional manner using reactants and conditions known in the art. Useful amine compounds include mono- and polyamines having from about 2 to about 60, preferably from about 3 to about 20, total carbon atoms and from about 1 to about 12, preferably from about 2 to about 7 nitrogen atoms in the molecule. These amines can be hydrocarbyl amines or hydrocarbyl amines having additional groups, such as alkoxy groups, amide groups, imidazoline groups, and the like.

Useful amines include 1,2-diaminoethane; 1,3-diaminopropane; 1,4-diamonobutane; 1,6-diaminohexane; diethylene triamine; triethylene tetramine; tetraethylene pentamine; 1,2-propylene diamine; di-(1,2-propylene) diamine; di-(1,2-propylene)triamine; di-(1,3-propylene) triamine; N,N-dimethyl-1,3-diaminopropane; N,N-di(2-aminoethyl) ethylene diamine; N,N-di(2-hydroxyethyl)1,3-propylene diamine; 3-dodecyloxy-propylamine; N-dodecyl-1,3-propane diamine; tris hydroxymethylaminomethane; diisopropanol amine; diethanol amine; triethanol amine; mono-, di-, and tri-tallow amines; N-(3-aminopropyl)morpholine; 3-dodecyloxypropylamine; N-(2-aminoethyl) morpholine; 2-amino pyridine, 2-methylamino pyridine; 3-methylamino pyridine; 2-aminothiazole; 2-amino-2thiazoline; 2-amino pyrimidine; 2-amino benzothiazole; methyl-1-phenyl hydrazine; para-morpholino aniline; N-aminopropyl imidazole and variants thereof; N-aminopropyl pyrrolidone and variants thereof; N-aminopropyl piperidine and variants thereof; N-phenyl phenylenediamine; and the like.

Especially preferred are amines having a single primary amine group, with any other amine groups present being tertiary amine groups. This inhibits cross-linking which is particularly important when the polymer has a relatively high degree of acidity, e.g. above 0.1 meq./g. of polymer. Mixtures comprising about 70 wt. % or more of amines having only a single primary or secondary group can be used with small amounts of amines having two or more primary or secondary amine groups. Acidities below 0.1 meq./g. polymer are less sensitive to cross-linking and amines with 2 or more reactive groups, i.e. either primary or secondary amine groups, or both primary and secondary amine groups, or a primary amine group and an alcohol group, can be used.

The amines will generally be used in the range of from about 0.1 to about 10 wt. %, preferably from about 0.5 to about 5 wt. %, based on the weight of the hydrocarbon polymer. The amine is preferably used in an amount that neutralizes the acid moieties by formation of amides, imides, or salts.

Preferably, the amount of amine used is such that there is 1 to 2 moles of polyamine reacted per equivalent mole of dicarboxylic acid. For example, with an ethylene-propylene copolymer of 40,000 number average molecular weight, grafted with an average of 4 maleic anhydride groups per molecule, preferably about 4 to 8 molecules of amine are used per molecule of grafted ethylene-propylene copolymer.

The polymer, grafted with acidic moieties, preferably in solution generally equal to about 5 up to 50 wt. %, preferably 10 to 30 wt. % polymer, can be readily reacted with amines by heating at a temperature of from about 100° C. to 250° C., preferably from about 120° to 230° C., for from about 0.5 to about 10 hours, preferably from about 1 to about 6 hours. The heating is preferably carried out to favor formation of imides and amides. Reaction ratios can vary considerably, depending upon the reactants, amounts of excess, type of bonds formed, and the like.

In a preferred embodiment, about 5 to 95% of the copolymer is dissolved in 95 to 5 wt. % of the aromatic ester to form a solution along with about 0.05 to 10 wt. % of the unsaturated material and about 0.005 to 10 wt. % of the initiator based on the weight of the solution. Then, after the grafting step, about 40 to 500 wt. %, based upon the weight of the solution, of a mineral or synthetic lubricating oil is added, followed by the addition of an amine sufficient to neutralize the acid and heating at 100° C. to 250° C. for 0.5 to 10 hours.

The advantages and the important features of the present invention will be more apparent from the following examples.

EXAMPLES

A series of products was prepared as detailed in Examples 1 through 3 below. The procedure in all cases was performed in two steps.

In the first step, the grafting solvent media were added to 375 g of ethylene-propylene copolymer (EP) (in which the polymer substrate consisted of about 57 mole percent ethylene and 43 mole percent propylene having a number average molecular weight of about 20,000), in a one to three ratio, and heated to about 180° C. with stirring, under a nitrogen blanket, until the EP was dissolved. Maleic anhydride was added, as a thirty percent concentrate in a carrier solvent, at a rate of 0.604 g/min over one hour. Peroxide catalyst (di-t-butyl peroxide) was added concurrently in a ratio of 2.43 with respect to the maleic anhydride to be added. After the additions were completed, the reaction mass was post-reacted for a period of time sufficient to ensure the decomposition of all peroxide. This was followed by vacuum stripping, with a nitrogen sparge to remove residual maleic anhydride. After the grafting reaction was completed, there was added a sufficient amount of solvent neutral 100 (SN100), a paraffinic mineral oil, to bring the polymer content to 50% to facilitate handling.

In the second step, the maleated polymer in oil was stirred with an equal amount of SN100 oil and heated to 160° C. under a nitrogen blanket. Neutralization was then carried out with an equimolar amount of amine based on the charged maleic anhydride, followed by a nitrogen sparge for three hours to strip out water produced by the reaction. Dinonyl phenol was then added, in a ratio of 2 with respect to the amine charged, as a co-solvent. Each product was then cooled and filtered through a 100 mesh screen.

Example 1

EP was grafted in the presence of dibutyl phthalate as the grafting solvent medium and derivatized with N-(4-anilinophenyl)-3-aminobutanamide according to the above-described procedure. The product will be referred to herein as Prodex 1.

Example 2

EP was grafted in the presence of di-undecyl phthalate as the grafting solvent medium and derivatized with N-(4-anilinophenyl)-3-aminobutanamide according to the above-described procedure. The product will be referred to herein as Prodex 2.

Example 3

EP was grafted in the presence of di-isodecyl phthalate as the grafting solvent medium and derivatized with N-(4-anilinophenyl)-3-aminobutanamide according to the above-described procedure. The product will be referred to herein as Prodex 3.

Example 4

Comparative Example

EP was grafted in the presence of solvent neutral 100 (SN100) as the grafting solvent medium, as disclosed in U.S. Pat. No. 4,517,104, and derivatized with N-(4-anilinophenyl)-3-aminobutanamide. The product will be referred to herein as Prodex 4.

Deposit Control Test

Thermo-Oxidative Engine Oil Simulation Test (TEOST)

TEOST Formulation

The additives were tested for effectiveness in a motor oil formulation (See description in Table 1 and compared to an identical formulation.

TABLE 1

| SAE 10W-30 Motor Oil Formulation (Base Blend) | |
|---|---|
| | Weight Percent |
| Solvent Neutral 100 | Balance |
| Overbased Calcium Sulfonate Detergent | 1.3 |
| Rust/Corrosion Inhibitor | 0.75 |
| Antioxidant | 0.5 |
| Pour Point Depressant | 0.1 |
| OCP VI Improver | 5.5 |
| ZDDP | 0.8 |
| Example X | 2.5 |

The Deposit control properties of the above examples were determined in the Thermo-Oxidative Engine Oil Simulation Test (TEOST). The test is used to determine the amount of deposits formed by automotive engine oils, and is run as a version of ASTM test D6335-98 with the number of cycles increased to increase the severity of the test.

In this test, a sample of engine oil at a temperature of 100° C. that contains ferric naphthenate and is in contact with nitrous oxide and moist air is pumped at a set flow rate past a tared depositor rod. The rod is resistively heated through 9.5 minute temperature cycles that go from 200–480° C. When all cycles are completed, the rod is rinsed of oil residue and dried to obtain a gross mass. The oil sample is flushed from the system and passed through a tared filter. The mass of deposits on the rod and filter is the total deposit mass. Performance is measured as total deposit mass in milligrams with results typically between 10 and 100. The lower the number versus the reference, the better the performance of the oil formulation. Table 2 lists the parameters for the TEOST as performed, with results for the graft and derivatized polymer in mineral oil samples (Examples 1–4) found in Table 3. Results are the average of two runs on two separate blends.

TABLE 2

TEOST Parameters

| Conditions | Setting |
| --- | --- |
| Reactor Temperature | 100° C. |
| Temperature Cycle | 200–400° C. |
| Number of Cycles | 25 |
| Cycle time | 9.5 min |
| Oil Flow Rate | 0.45 mL/min |
| Oil Volume | 116 mL |
| N$_2$O/moist air Flow Rate | 3.5 mL/min |
| Catalyst (Iron naphthenate) | 100 ppm |

TABLE 3

TEOST Results

| Example | Description | Deposits (mg) | % Deposit Decrease |
| --- | --- | --- | --- |
| 5 | Base Blend[1] | 70.2 | N.A. |
| 6 | Base Blend with Prodex 1 | 37.5 | 46.6 |
| 7 | Base Blend with Prodex 2 | 36.4 | 48.1 |
| 8 | Base Blend with Prodex 3 | 34.8 | 50.0 |
| 9 | Base Blend with Prodex 4 | 42.6 | 39.3 |

[1]Base Blend refers to the formulation in Table 1.

It can be seen from the above data that using the phthalate esters as the grafting solvent media for grafting reduces the total deposit mass. For instance, the addition of Prodex 3 to the base blend reduces deposit formation by 50 percent while the addition of Prodex 4 (comparative) to the base blend reduced deposit formation by only 39.3 percent.

Physical Properties

Kinematic Viscosity/Hunter Colorimeter Haze Test

The kinematic viscosity and haze value of the products of Examples 1 through 4 were measured. Kinematic viscosity was measured at 210° F. (about 100° C.) and is reported in Centistokes. The additive concentrates were placed into 2-cm polystyrene tissue culture flasks to determine haze value using a Hunter Colorimeter.

TABLE 4

Haze and Kinematic Viscosity

| Example | Description | Haze Value | Viscosity |
| --- | --- | --- | --- |
| 10 | Prodex 1 | 20.6 | 679 |
| 11 | Prodex 2 | 12.9 | 792 |
| 12 | Prodex 3 | 12.9 | 811 |
| 13 | Prodex 4 | 59.0 | 651 |

As can be seen, using the phthalate ester as a grafting solvent medium has no appreciable effect on the viscosity of the final product, but can improve the haze value significantly versus using mineral oil as the grafting solvent medium.

In view of the many changes and modifications that can be made without departing from principles underlying the invention, reference should be made to the appended claims for an understanding of the scope of the protection to be afforded the invention.

What is claimed is:

1. A process comprising:
   (A) dissolving a hydrocarbon polymer in one or more solvents selected from the group consisting of aromatic ester oils of the formula

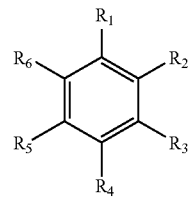

wherein $R_1$, $R_2$, $R_3$, $R_4$, $R_5$, and $R_6$ are independently selected from the group consisting of hydrogen, —COOR$_7$, —COOR$_8$, —COOR$_9$, —COOR$_{10}$, —COOR$_{11}$, and —COOR$_{12}$, provided that no more than 5 of $R_1$, $R_2$, $R_3$, $R_4$, $R_5$, and $R_6$ are hydrogen, and $R_7$, $R_8$, $R_9$, $R_{10}$, $R_{11}$, and $R_{12}$ are independently selected from the group consisting of alkyl and alkylesters to form a solution of said hydrocarbon polymer in said solvent(s); and
   (B) adding an ethylenically unsaturated $C_3$ to $C_{10}$ carboxylic acid material and a free radical initiator to said solution over about 0.1 to about 12 hours at a temperature of from about 25° C. to about 250° C., whereby said ethylenically unsaturated $C_3$ to $C_{10}$ carboxylic acid material is grafted onto said hydrocarbon polymer;
wherein said hydrocarbon polymer has previously been prepared from at least one $C_2$ to $C_{28}$ polymerizable hydrocarbon and has a number average molecular weight in the range of from about 5,000 to about 500,000.

2. The process of claim 1, wherein the hydrocarbon polymer is a copolymer of ethylene with a $C_3$ to $C_{28}$ alpha olefin.

3. The process of claim 2 wherein the copolymer comprises from about 15 to about 90 weight percent ethylene and, correspondingly, from about 85 to about 10 weight percent of the alpha olefin.

4. The process of claim 2 wherein the $C_3$ to $C_{28}$ alpha olefin is propylene.

5. The process of claim 3 wherein the $C_3$ to $C_{28}$ alpha olefin is propylene.

6. The process of claim 1 wherein about 5 to 95 % of the copolymer is dissolved in 95 to 5 wt. % of the aromatic ester to form the solution, the amount of the unsaturated material is about 0.05 to 10 wt. % based upon the weight of the solution, and the amount of the initiator is about 0.005 to 10 wt. % based on the weight of the solution.

7. The process of claim 6 further comprising, after the grafting step, the steps of adding about 40 to 500 wt. %, based upon the weight of the solution, of mineral or synthetic lubricating oil and then adding an amine sufficient to neutralize the acid and heating at 100° C. to 250° C. for 0.5 to 10 hours.

8. The process of claim 7, wherein the unsaturated material is maleic anhydride and the amine is N-(4-anilinophenyl)-3-aminobutanamide.

9. The process of claim 6, wherein the unsaturated material is a nitrogen-containing ethylenically unsaturated monomer.

10. The process of claim 9, wherein the nitrogen-containing monomer is selected from the group consisting of vinyl pyridines, vinyl pyrrolidones, vinyl imidazoles, and amine group-containing acrylates and methacrylates.

* * * * *